Oct. 11, 1966 D. DANIELS 3,277,577
WORKPIECE POSITIONING STRUCTURE
Filed April 5, 1963 3 Sheets-Sheet 1
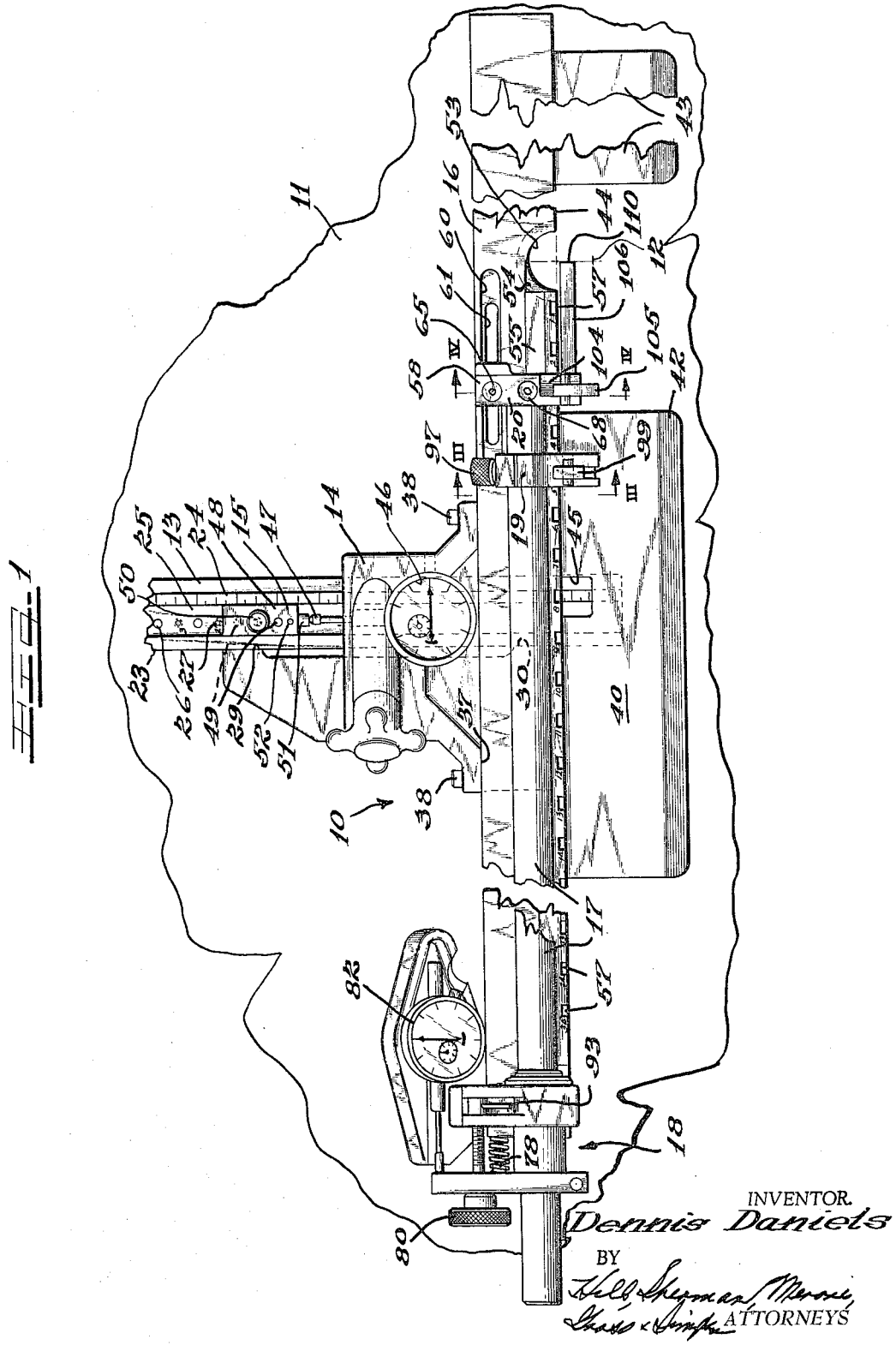
INVENTOR.
Dennis Daniels
BY
ATTORNEYS

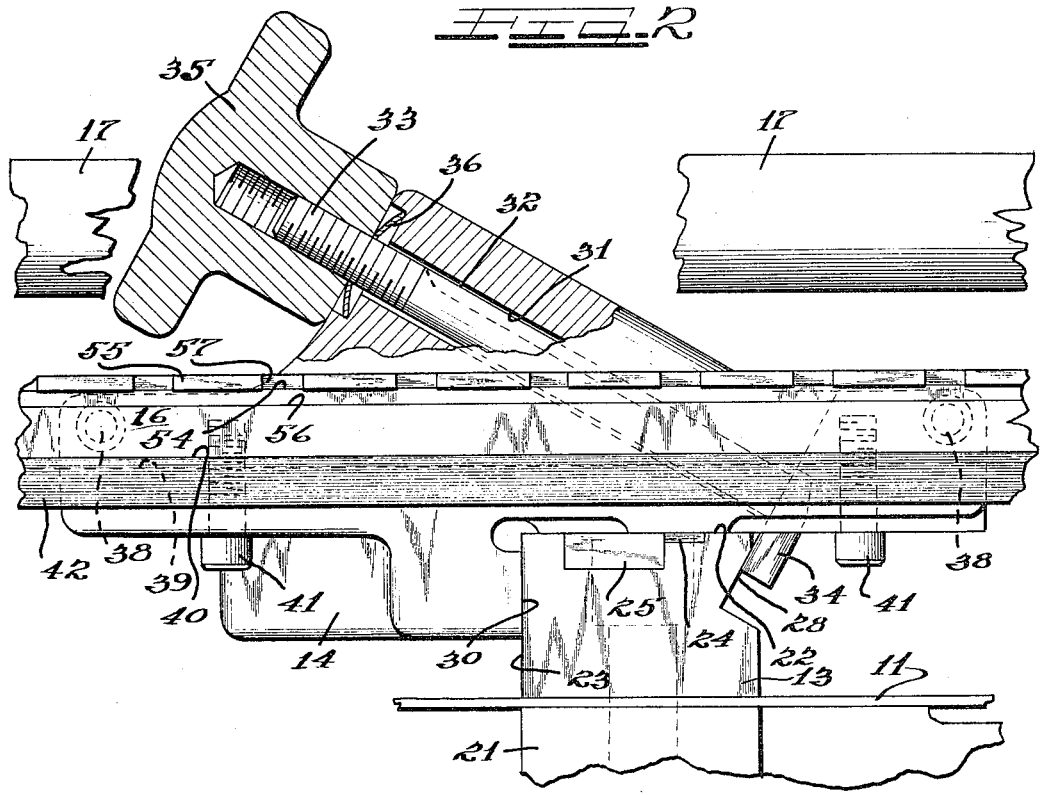
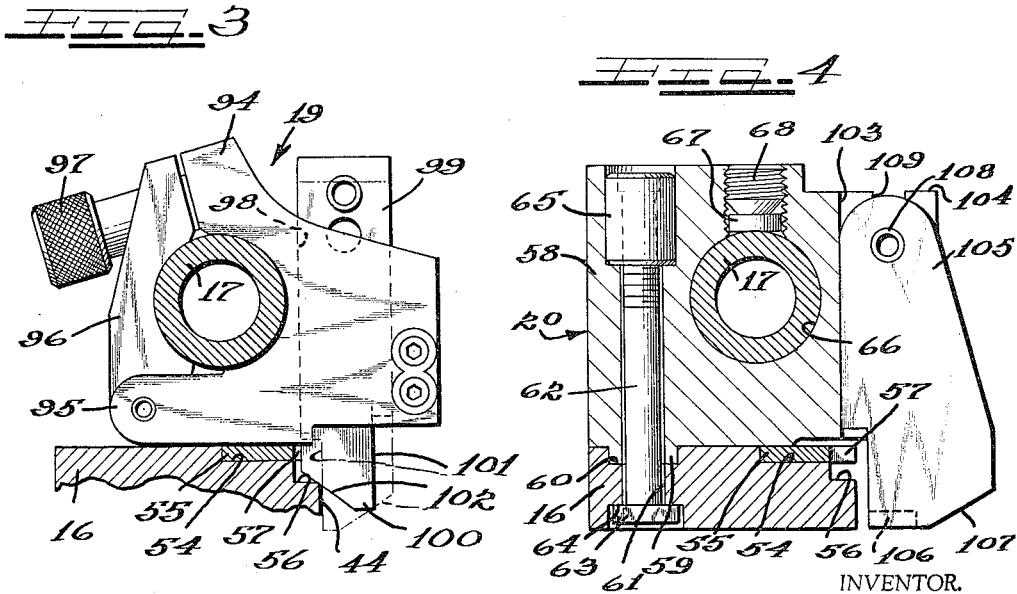

Oct. 11, 1966  D. DANIELS  3,277,577
WORKPIECE POSITIONING STRUCTURE
Filed April 5, 1963  3 Sheets-Sheet 3
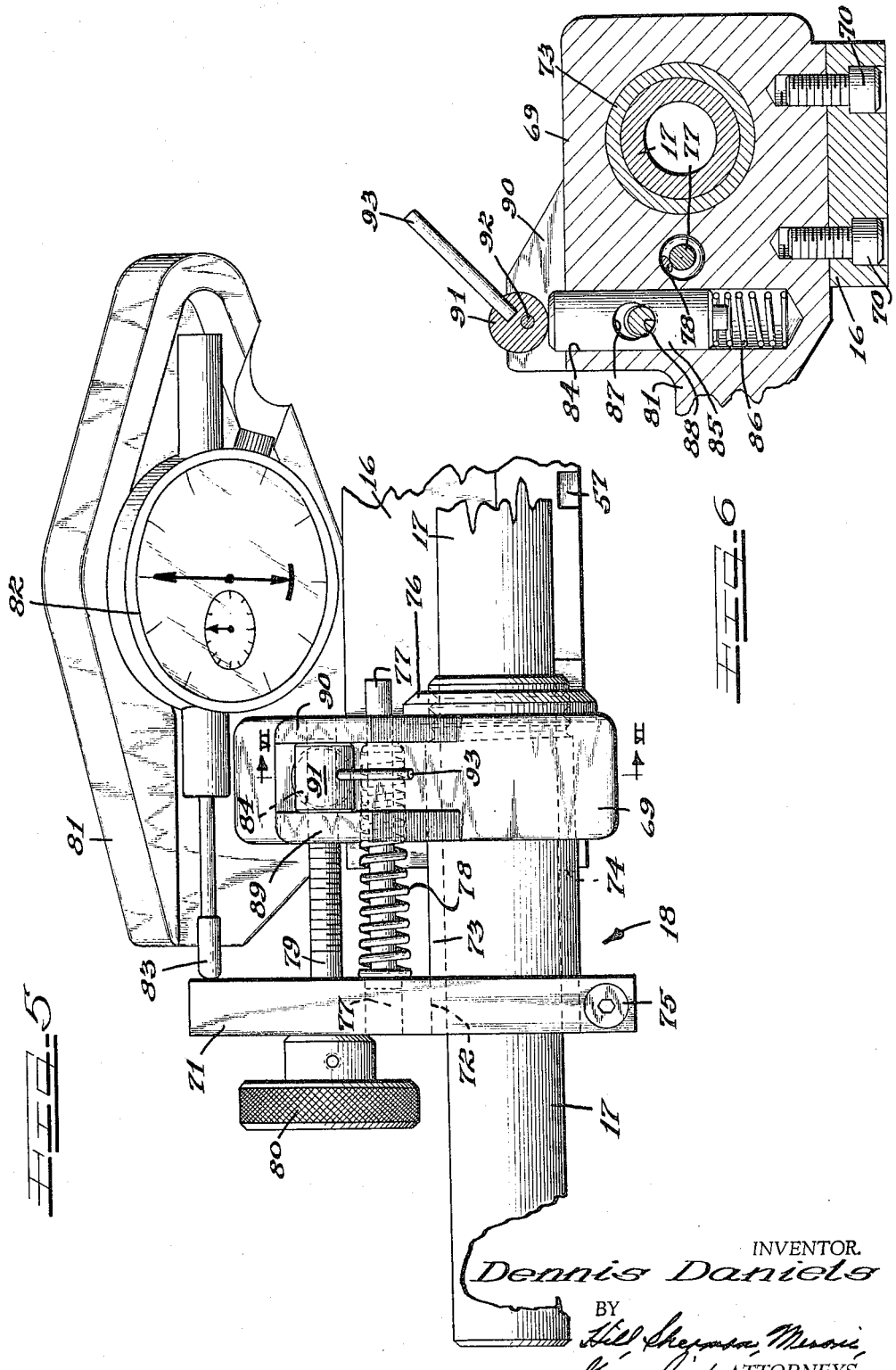

United States Patent Office 3,277,577
Patented Oct. 11, 1966

3,277,577
WORKPIECE POSITIONING STRUCTURE
Dennis Daniels, Williamsville, N.Y., assignor to Houdaille Industries, Inc., Buffalo, N.Y., a corporation of Michigan
Filed Apr. 5, 1963, Ser. No. 270,903
18 Claims. (Cl. 33—174)

This invention relates generally to gaging structure, and more specifically to an improved workpiece positioning structure.

Although the principles of the present invention may be included in various machine tools, a particularly useful application is made in a punching machine of the type having a table which supports a workpiece and a die beneath the workpiece, together with a ram-driven punch thereabove. In such a machine, the punch and die or other tool means are relatively reciprocable along a vertical axis, the intersection of which with the table constitutes a reference point. The workpiece is moved about to various positions on the table so that a reference edge is disposed a selected distance from the reference point, which typically comprises the axis of a prospective hole in the workpiece.

The present invention includes means for engaging the workpiece along two adjacent edges, such means being movable from the front to the rear of the machine (Y-axis), and also being movable laterally (X-axis).

Accordingly, it is an object of the present invention to provide an improved workpiece positioning structure.

Another object of the present invention is to provide a workpiece positioning structure wherein there is a direct reading indication of the distances that the reference edges of the workpiece are located from a reference point.

A still further object of the present invention is to provide means by which workpiece positioning stops may be set in a facile manner.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 1 is a top plan view of a workpiece positioning structure, partially broken away, constructed in accordance with the principles of the present invention;

FIGURE 2 is an enlarged fragmentary front elevational view of the central portion of FIGURE 1, the same being partially broken and partially shown in cross section;

FIGURE 3 is an enlarged cross-sectional view taken along line III—III of FIGURE 1;

FIGURE 4 is an enlarged cross-sectional view taken along line IV—IV of FIGURE 1;

FIGURE 5 is an enlarged view of the left end of FIGURE 1; and

FIGURE 6 is a cross-sectional view taken along line VI—VI of FIGURE 5.

As shown on the drawings:

The principles of this invention are particularly useful when embodied in a workpiece positioning structure such as illustrated in FIGURE 1, generally indicated by the numeral 10. The workpiece positioning structure 10 is secured to a machine tool having a horizontal table 11 with which there is associated appropriate tooling (not shown) having an axis or reference point 12 with respect to which it is desired to locate a workpiece (not shown).

The workpiece positioning structure 10 includes a horizontal rail 13, a housing 14 supported on the rail 13, a stop member 15 secured to the horizontal rail 13, an elongated rigid member or back-gage bar 16 secured to the housing 14, an elongated stop-support bar 17 slidably disposed on the rigid member or gage bar 16, means generally indicated at 18 which slidably supports the stop-support bar 17, and a number of workpiece-locating stops 19, 20 clampable to the stop-support bar 17.

As seen in FIGURE 2, the table 11 is supported on a frame 21 forming a part of the machine tool, and the horizontal rail 13 is bolted thereto. The horizontal rail 13 has an upper surface 22 on which the housing 14 is slidably supported, and has a lateral side 23 against which the housing 14 is slidably engaged. The horizontal rail 13 has a pair of upwardly directed grooves, in one of which there is disposed an elongated graduated scale 24, and in the other of which there is disposed a multi-apertured scale 25. As seen in FIGURE 1, the scale 24 extends along the length of the horizontal rail 13, the scale 25 extending a substantial portion thereof. The scale 25 has a series of locator apertures 26, typically spaced at 1-inch intervals. Between the apertures 26, there is a series of threaded openings 27. As seen in FIGURE 2, the horizontal rail 13 has a clamping or gib surface 28.

The housing 14 comprises a casting which rests upon the upper surface 22 of the horizontal rail 13, and includes integral elongated means 29, 30 (FIGURE 1) which slidably bear against the lateral side 23 of the horizontal rail 13. The housing 14 has an opening 31 terminating at its lower end in a slot through which there extends a clamp screw 32 having a threaded end 33 projecting therefrom at the upper end of the opening 31, the clamp screw 32 having a clamp 34 on its opposite end which extends through the housing slot into engagement with the clamping surface or gib 28. The slot through the housing through which the clamp 34 extends is sufficiently narrow so that the clamp screw 32 is prevented thereby from rotating. On the threaded end 33 of the screw 32, there is a threaded hand knob 35. A dished spring 36 acts between the housing 14 and the knob 35 to bias the clamp 34 against the clamping surface 28 and to bias the elongated means 29, 30 against the lateral side 23 of the horizontal rail 13. When the knob 35 is loosened slightly, the spring 36 expands maintaining the tension described, thereby holding the housing 14 in a square or engaging relation with the horizontal rail 13. While maintaining this relation, the structure is thereby enabled to be moved forwardly and backwardly, along the horizontal Y-axis, and when the same is in a desired position, tightening of the hand knob 35 against the housing 14 insures a positively locked relationship between the housing 14 and the horizontal rail 13. The housing 14 has a forwardly directed surface 37 against which the rigid member or gage bar 16 is disposed and secured as by a pair of screws 38. The housing 14 also has an upwardly directed surface 39 spaced upwardly from the upper surface 22 of the horizontal rail 13, on which surface 39 there rests a workpiece support 40, on the upper surface of which the rigid member or gage bar 16 rests. A pair of screws 41 extend through the housing 14, through the surface 39, through the workpiece support 40, and into the rigid member 16, holding these parts in a rigid assembled relationship.

The upper surface of the workpiece support 40 lies substantially coplanar with the tooling at the reference point 12. The workpiece support 40 thus supports a workpiece in spaced relation above the horizontal rail 13. The forward edge of the workpiece support 40 is downwardly directed or beveled as at 42.

In like manner, a further workpiece support 43 is secured to the rigid member or gage bar 16 on the opposite side of the reference point 12 for providing further support for the workpiece.

The forward edge 44 of the rigid member or gage bar comprises a gaging surface against which a reference edge of the workpiece may be disposed. The gaging surface 44 intersects the scale 24, and at the point of intersection, the workpiece support 40 is provided with an aperture 45 to enable the operator to view the graduation at which this intersection occurs, such graduation indicating directly the distance from the gaging surface 44 to the reference point 12.

To enable more precise reading of this distance the housing 14 is provided with a direct reading gage 46 of the dial type, which has a movable spindle 47 which coacts with the stop member 15. The stop member 15 includes a plate 48 having a pair of downwardly extending pins 49 received in a pair of apertures 26, 26, and between the pins 49, there is disposed a thumb screw 50 received in one of the threaded apertures 27. Projecting from the plate 48, there is an anvil 51 which is adjustable relatively thereto, and which adjustment is secured as by a set screw 52. This adjustment is utilized at the factory to synchronize or zero the dial gage 46 with respect to the other components of the device.

A basic dimension which typically comprises a number of inches which is a whole number, is indicated by the position of the stop member 15. To this dimension there is added the dial indicator reading from the dial gage 46, which typically reads in inches to the nearest thousandth of an inch the fractional part of an inch involved in the distance between the gaging surface 44 and the reference point 12.

The rigid member or gage bar 16 is provided with a semi-circular cutout 53 which is counterbored from below to accommodate such tooling as may be employed at the reference point 12, thereby enabling the tooling to act on the edge of the workpiece, in some instances the center of the tooling actually being offset outwardly from the workpiece. The rigid member 16 is further provided with a slot 54 within which there is disposed a graduated scale 55, here shown to have a 36-inch length. The scale 55 has the conventional graduations which have been omitted from the drawing. The slot 54 has at its forward edge a further slot 56, best seen in FIGURES 3 and 4, so that the forward edge of the scale 55 overhangs the slot 56. In the overhanging portion of the scale 55, there is provided at 1-inch intervals, a series of notches 57, the right edge of each slot 57 coinciding with the principal graduation for the dimension indicated by the scale numerals, the scale being so disposed in the slot 54 that it directly reads the distance from the reference point 12 to the right edge of each notch 57.

The stop-support bar 17 is supported on the rigid member 16 at each end thereof. At the right end of the stop-support bar 17, there is provided the workpiece-locating stop 20 which also forms a part of the supporting means for the stop-support bar 17.

Referring to FIGURE 4, the workpiece-locating stop 20 includes a block 58 having a downwardly directed key 59 received in an elongated recess 60 in the rigid member 16, the recess 60 being slotted for a portion of its length, as at 61. The block 50 has a vertical aperture in which there is disposed a T-bolt 62 having a shank extending through the key 59 and slot 61, and terminating at its lower end in a head 63 received in a downwardly directed slot 64 in the rigid member 16. The upper end of the T-bolt 62 is threaded and receives a socket-head nut 65. Tightening of the nut 65 rigidly clamps the workpiece-locating stop 20 to the rigid member 16. The block 58 has an aperture 66 through which the stop-support bar 17 slidably extends. A plug 67 and a set screw 68 are normally loose so as not to restrict axial sliding or endwise movement of the stop-support bar 17.

At the opposite end of the rigid member 16, there is provided a housing 69 which is secured by a pair of screws 70 to the upper surface thereof. This is best seen in FIGURES 5 and 6. A bracket 71 has a slotted opening 72 into which there extends a tubular portion 73, the tubular portion 73 being slotted in an axial direction from its left end up to a point indicated at 74. A screw 75, carried by the bracket 71, may be tightened to thereby clamp the left or slotted end of the tubular member against the stop-support bar 17. The tubular portion 73 of the bracket 71 extends through an opening in the housing 69 and is freely slidable therein. Thus, means are provided for supporting the stop-support bar in a manner which enables sliding movement thereof in an axial or endwise direction. If both of the screws 68 and 75 are loose, the stop-support bar 17 may be moved as desired to provide such clearance as may be needed at the right end thereof. If the screw 75 be tightened, the stop-support bar 17 is rendered comovable with the bracket 71 for purposes described in detail below.

At its right end, the tubular portion 73 is screw-threaded and carries an angularly adjustable collar 76 which is locked thereto in a desired position. Axial movement of the tubular portion 73 is limited to the right by engagement between the bracket 71 and the housing 69, and axial movement of the tubular portion 73 and the stop-support bar 17 to the left is limited by engagement of the collar 76 against the housing 69. As drawn, the parts are shown in the left-most position, which is a normal operating position.

The bracket 71 is provided with a pilot pin 77 which typically is pressed therein, and which extends freely through a portion of the housing 69. The pilot pin 77 is surrounded by a spring 78 which acts between the housing 69 and the bracket 71 to urge the bracket and the stop-support bar 17 to the normal position, as illustrated. Upon movement of the bracket 71 and stop-support bar 17 to the right, followed by release thereof, the spring 78 will return these components to the illustrated position.

To facilitate such movement to the right, there is provided a hand screw 79 which has a knob 80 for rotating it. Upon rotation of the hand screw 79, which threadedly coacts with the housing 69, the bracket 71 together with the stop-support bar 17 is shifted to the right, thereby displacing the collar 76 from the housing 69.

The housing 69 includes a rearwardly disposed angularly extending dial indicator holder portion 81, within which portion 81 of the housing 69 there is disposed and secured a direct reading gage 82 of the dial indicator type, the same having a movable spindle 83 normally engaging the bracket 71. With the direct reading gage 82 zeroed when the bracket 71 is in the position illustrated, the magnitude of any movement thereof to the right is directly indicated on such direct reading gage 82. This reading is added to the basic or main-graduation reading on the scale 55, as described in further detail below, to obtain the distance that the workpiece-locating stop 19 or 20 is disposed from the reference point 12. Upon completion of adjustment of such workpiece-locating stop 19, 20, it is desired then to move the stop-support bar 17 and the bracket 71 back to the normal position where the collar 76 engages the housing 69. This may be accomplished by reversely rotating the hand screw 79. However, and preferably, there is provided a vertical cavity 84 within which there is disposed a plunger 85, best seen in FIGURE 6, the plunger 85 being biased in an upward direction by a spring 86. The plunger 85 has a transverse hole 87 which is vertically elongated, the lower portion of which opening 87 is threaded as at 88, to thereby define a half nut. The threads of the hand screw 79 coact with the threads at 88 to shift the housing 69 laterally. However, there is further provided a pair of bifurcations 89, 90 between which there is disposed a cam 91 pivoted on a pin 92 carried by the bifurcations 89, 90. The cam 91 has an actuator handle 93, and has a peripheral surface which engages the upper end of the half nut or plunger 85. Upon rocking movement of the cam 91, such as in either direction, a cam rise will cause a downward movement of the plunger 85, to thereby release the threads 88 from the hand screw 79, thereby enabling the spring 78 to instantly return the bracket 71 and the stop-support bar 17 to the normal or illustrated position. Thus the mechanism under the control of the handle 93 comprises a release mechanism for effecting such return.

The mechanism generally indicated at 18 thus not only provides means by which the stop-support bar is slidably supported, but also provides means for shifting the same in an endwise direction, provides means for indicating the extent of such shift, provides means for returning the same to the normal position, provides means for selectively obtaining a rapid release or return of the same, and provides means 76 for synchronizing the indications of travel with the reference point 12.

Referring to FIGURE 3, the stop structure 19 is shown in detail. The workpiece-locating stop 19 includes a body 94 which has a bifurcated portion 95 on which there is pivoted a clamp arm 96 under the control of a thumb screw 97. When the thumb screw 97 is loose, the stop structure 19 may be moved back and forth on the stop-support bar 17 to any desired position, and there clamped. These positions may be approximately indicated by the scale 55. However, the present structure enables a somewhat more accurate setting of the workpiece-locating stop 19. At the forward end of the body 19, there is a vertical slot 98 within which there is disposed a stop finger 99 having a pair of opposite parallel faces 100. The finger 99 may be disposed in the slot 98 as shown in solid lines in FIGURE 3, and when it is so positioned, it is received in one of the slots 57, the thickness of the finger 99 being such that it is snugly received in the notch 57. The notch 57 thus enables the stop finger to be set at one of the principal dimensions more accurately than it can be so set by sight. If this is the last stop or dimension to be set, the finger 99 may be left as it is. Preferably, it is withdrawn and reinserted after having been turned front to back, 180°, as shown in chain lines. The finger 99 is slotted as at 101, the slot or recess or undercut 101, when the finger is reversed as shown in chain lines, enabling the stop 19 to be moved axially along with the stop-support bar 17.

When it is desired to set the workpiece-locating stop 19 to a predetermined dimension, the stop 19 is moved so that the finger 99 is received in the notch 57 which corresponds to the whole number of units in the dimension. This is done with the screw 97 loose. The knob 80 is rotated so that the remainder of the desired dimension is indicated on the direct reading gage 82. Then the screw 97 is tightened and the finger 99 is reversed after which the release lever 93 is actuated, thereby enabling the spring 78 to shift the stop-support bar 17 to the left by the desired preset amount. This step is repeated for each of the several workpiece-locating stops 19 which may be provided. The workpiece is then moved against the gaging surface 44, and then laterally against the right surface 100 of the finger 99. This completes the workpiece positioning which is then in position for having such work done on it as is desired. After such next operation is completed, the workpiece is retracted slightly from the gaging edge or surface 44 and moved to the left so that its left edge extends past the finger 99, after which the workpiece is again moved toward the reference surface 44. The finger 99 has a cam surface 102 thus engaged by the workpiece which effects elevating of the finger 99, enabling the workpiece to actually engage the surface 44, for subsequent movement to the left against the next successive workpiece-locating stop 19.

The workpiece-locating stop 20 has a slot 103 which corresponds to the slot 98 and which receives the finger 99 for adjustment and use. Preferably, the block 58 is beveled as at 104 to provide a measure of clearance with tooling at the reference point 12. In some instances, such beveling 104 will be inadequate because the dimension on the workpiece to be located is extremely close to the left edge thereof. It is, therefore, contemplated that the workpiece-locating stop 20 be set to the left by an integral number of units, here illustrated to be three inches, and after the finger 99 has been used as described below to accurately position the same, the finger 99 is removed and a substitute finger 105 is provided. As seen in FIGURE 1, the finger 105 has a shallow extension 106 approximating the thickness of a typical workpiece, and which can extend beneath any interfering tooling. In the example shown, the length of the finger 106 from the right edge of the notch 57 is an integral number of main units, here three inches, which is mentally compensated for in the setting of the stop 20. The stop finger 105 likewise has a cam surface 107 by which the same is raised by the workpiece when the workpiece is to be associated with a further stop. A transverse pin 108 received in a pair of lateral slots 109 is used not only to facilitate insertion and removal, but also assists in guiding or retaining the stop finger 105 during upward camming thereof.

If no stop finger is to be used in the block 58, the block 58 is merely set at a convenient position where the same clears the tooling, the nut 65 being tight and the screw 68 being loose. This enables the stop-support bar 17 to move axially therein. When a finger is to be employed in the block 58, both the nut 65 and the screw 68 are loosened to enable the block 58 to be moved laterally so that the finger 99 therein may be received in the proper notch 57. Then the stop-support bar 17 is shifted axially to the extent needed, and the screw 68 is tightened. Upon actuation of the release means 93, the block 58 will shift to the left by the appropriate distance, namely that indicated on the direct reading gage 82, at which position the nut 65 is tightened to firmly fix the location of the stop finger 99 or 105. The screw 68 is then loosened to enable the stop-support bar to be moved axially or endwise again for the setting of other workpiece-locating stop 19.

An end 110 of the finger 106 functionally corresponds to the surface 100 of the finger 99 when both are in the ready-to-use position, these surfaces both comprising workpiece-locating surfaces.

Since the stop-support bar 17 moves to the right in the positioning of the finger 99, any clearance which may be present between the finger 99 and the edges which define the notches 57 is taken up in the same direction that the clearance will be subsequently taken up when the workpiece engages the finger 99.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A structure for accurately positioning a workpiece in relation to a predetermined reference point, comprising in combination:
    (a) an elongated rigid member having graduations related to the distance to said reference point;
    (b) an elongated stop-support bar;
    (c) means supporting said stop-support bar on said rigid member in a manner enabling said stop-support bar to be freely moved endwise thereon; and
    (d) a workpiece-locating stop clampable to said stop-support bar and movable therewith to a selected effective distance from said reference point, said stop also being clampable to said rigid member and, when unclamped from said stop-support bar, forming a part of said supporting means.

2. A structure for accurately positioning a workpiece in relation to a predetermined reference point, comprising in combination:
    (a) an elongated rigid member having graduations related to the distance to said reference point;
    (b) an elongated stop-support bar;

(c) means supporting said stop-support bar on said rigid member in a manner enabling said stop-support bar to be freely moved endwise thereon; and (d) a workpiece-locating stop clampable to said stop-support bar and movable therewith to a selected effective distance from said reference point, said stop also being coactive with said rigid member to form a part of said supporting means.

3. A structure for accurately positioning a workpiece in relation to a predetermined reference point, comprising in combination:

(a) an elongated rigid member having a series of notches located predetermined distances from said reference point;

(b) an elongated stop-support bar adapted to support a stop substantially anywhere along its length;

(c) means supporting said stop-support bar on said rigid member in a manner enabling said stop-support bar to be freely moved endwise thereon; and (d) a stop assembly including a finger having a workpiece-engaging surface retractably receivable in one of said notches, said stop assembly being clampable to said stop-support bar at a selected position along its length, said workpiece-engaging surface of said finger being movable out of said notch, while the stop assembly is so clamped, to enable endwise movement of said stop-support bar jointly with said stop assembly.

4. A structure for accurately positioning a workpiece in relation to a predetermined reference point, comprising in combination:

(a) an elongated rigid member having graduations related to the distance to said reference point;

(b) a stop-support bar having a length substantially coextensive with said graduations and adapted to support a number of stops substantially anywhere along its length;

(c) means supporting said stop-support bar on said rigid member in a manner enabling said stop-support bar to be freely moved endwise thereon;

(d) means coactive between said rigid member and said stop-support bar and operative to indicate the distance which said stop-support bar has been moved endwise with respect to said graduations; and (e) a number of workpiece-locating stops clampable to said stop-support bar at any selected position along the length of said stop-support bar and movable therewith.

5. A structure for accurately positioning a workpiece in relation to a predetermined reference point, comprising in combination:

(a) an elongated rigid member having graduations related to the distance to said reference point;

(b) a stop-support bar having a length substantially coextensive with said graduations and adapted to support a number of stops substantially anywhere along its length;

(c) means supporting said stop-support bar on said rigid member in a manner enabling said stop-support bar to be freely moved endwise thereon; and (d) a number of stops clampable to said stop-support bar immediately adjacent to said graduations for direct coaction therewith, and having a workpiece-locating surface directed toward said reference point.

6. A structure for accurately positioning a workpiece in relation to a predetermined reference point, comprising in combination:

(a) an elongated rigid member having graduations related to the distance to said reference point;

(b) an elongated stop-support bar;

(c) a bracket freely slidably supported on said rigid member, said bracket having a tubular portion slidably receiving and normally clamped to said stop-support bar for joint movement; and (d) a workpiece-locating stop clampable to and movable with said stop-support bar.

7. A structure for accurately positioning a workpiece in relation to a predetermined reference point, comprising in combination:

(a) an elongated rigid member having graduations related to the distance to said reference point;

(b) an elongated stop-support bar adapted to support a number of stops substantially anywhere along its length;

(c) a housing secured to said rigid member and having a portion extending transversely to the length of said rigid member and supporting said stop-support bar in a manner enabling said stop-support bar to be freely moved endwise thereon; and (d) a workpiece-locating stop clampable to and movable with said stop-support bar.

8. A structure for accurately positioning a workpiece in relation to a predetermined reference point, comprising in combination:

(a) an elongated rigid member having a series of notches located predetermined distances from said reference point;

(b) an elongated stop-support bar;

(c) a housing secured to said rigid member;

(d) a bracket freely slidably supported on said housing, and normally clamped to said stop-support bar; and (e) a workpiece location stop receivable in one of said notches and clampable to said stop-support bar, said stop being movable out of said notch while so clamped and movable with said stop-support bar.

9. A structure for accurately positioning a workpiece in relation to a predetermined reference point, comprising in combination:

(a) an elongated rigid member having graduations related to the distance to said reference point;

(b) an elongated stop-support bar;

(c) a housing secured to said rigid member;

(d) a bracket freely slidably supported on said housing, and normally clamped to said stop-support bar, said bracket including an adjustable collar engageable with said housing;

(e) means coactive between said housing and said bracket and operative to indicate the distance which said bracket has been moved from the position where said collar engages said housing; and (f) a workpiece-locating stop clampable to and movable with said stop-support bar.

10. A structure for accurately positioning a workpiece in relation to a predetermined reference point, comprising in combination:

(a) an elongated rigid member having a series of notches located predetermined distances from said reference point;

(b) an elongated stop-support bar;

(c) a housing secured to said rigid member;

(d) supporting means for said stop-support bar including a bracket having a tubular portion freely slidably supported on said housing, said tubular portion slidably receiving and being normally clamped to said stop-support bar for joint movement;

(e) an adjustable collar carried on said tubular portion and engageable with said housing to define a normal position of said bracket;

(f) a spring acting between said housing and bracket and normally urging said bracket to said normal position;

(g) a hand screw operative against the force of said spring, and acting between said bracket and said housing for shifting said stop-support bar endwise;

(h) a direct reading gage carried by said housing and responsive to the position of said bracket, and operative to indicate the distance said bracket and said stop-support bar have been shifted from said normal position;

(i) a release mechanism carried by said housing and normally coactive with the threads of said hand screw, said mechanism being operative when actuated to enable said spring to return said bracket to said normal position; and (j) a stop assembly including a workpiece-locating finger retractably receiving in one of said notches, said stop assembly being clampable to said stop-support bar, said finger being movable out of said notch, while the stop assembly is so clamped, to enable endwise movement of said stop-support bar jointly with said stop assembly.

11. A structure for accurately positioning a movable workpiece in relation to a predetermined fixed reference point, comprising in combination:

(a) a fixed horizontal rail having a flat upper surface and a flat lateral side;

(b) a housing slidably guided on said rail only against said flat upper surface and said flat lateral side thereof;

(c) a direct reading gage rigidly secured to said housing for movement therewith and having an axially movable spindle extending parallel to said rail;

(d) a stop member engageable by said spindle and attachable to said rail only at a number of specific fixed positions therealong;

(e) a gage bar secured to said housing for movement therewith and having an elongated horizontal gaging surface directly engageable by the workpiece, and extending at a right angle to said rail; and (f) graduations on said rail, jointly with said gage, indicating the distance that said gaging surface is spaced from said reference point.

12. A structure for accurately positioning a movable workpiece in relation to a predetermined fixed reference point, comprising in combination:

(a) a fixed horizontal rail having a flat upper surface and a flat lateral side;

(b) a housing slidable on said flat upper surface of said rail, and having integral elongated means slidably guided and resiliently biased laterally against said flat lateral side thereof;

(c) a direct reading gage rigidly secured to said housing for movement therewith and having an axially movable spindle extending parallel to said rail;

(d) a stop member engageable by said spindle and attachable to said rail only at a number of specific fixed positions therealong;

(e) a gage bar secured to said housing for movement therewith and having an elongated horizontal gaging surface directly engageable by the workpiece, and extending at a right angle to said rail; and (f) graduations on said rail, jointly with said gage, indicating the distance that said gaging surface is spaced from said reference point.

13. A structure for accurately positioning a movable workpiece in relation to a fixed predetermined reference point, comprising in combination:

(a) a fixed horizontal rail;

(b) a unitary housing slidably guided on said rail for horizontal movement;

(c) an elongated horizontal gage bar rigidly secured to said housing for movement therewith, said gage bar extending at a right angle to the length of said rail and being disposed in spaced relation above said rail, said gage bar having a flat vertical edge extending along its length and comprising a gaging surface engageable by an edge of the workpiece and likewise extending at a right angle to said rail; and (d) a workpiece support lying in a plane overlying said rail and rigidly secured to one of said gage bar and housing for movement therewith, said workpiece support having a flat upwardly directed surface extending from beneath said gage bar along a portion of its length, said upwardly directed surface substantially coinciding with the lower edge of said flat vertical edge for a distance along opposite sides of the reference point.

14. A structure for accurately positioning a workpiece in relation to a predetermined reference point, comprising in combination:

(a) an elongated rigid member having graduations related to the distance to said reference point;

(b) an elongated stop-support bar adapted to support a number of stops substantially anywhere along its length;

(c) means supporting said stop-support bar on said rigid member in a manner enabling said stop-support bar to be freely moved endwise thereon;

(d) means coactive between said rigid member and said stop-support bar for shifting said stop-support bar endwise with respect to said graduations; and (e) a number of stops clampable to said stop-support bar immediately adjacent to said graduations for direct coaction therewith, and having a workpiece-locating surface directed toward said reference point.

15. A structure for accurately positioning a workpiece in relation to a predetermined reference point, comprising in combination:

(a) an elongated rigid member having a series of notches located predetermined distances from said reference point;

(b) an elongated stop-support bar adapted to support a stop substantially anywhere along its length;

(c) means supporting said stop-support bar on said rigid member in a manner enabling said stop-support bar to be freely moved endwise thereon; and (d) a stop having a workpiece-engaging surface receivable in one of said notches and clampable to said stop-support bar at a selected position along its length, said workpiece-engaging surface of said stop being movable out of said notch while said stop is so clamped and movable with said stop-support bar.

16. A structure for accurately positioning a movable workpiece in relation to a predetermined fixed reference point comprising in combination:

(a) an elongated rigid member having graduations disposed in fixed relation as to the distance to said reference point;

(b) an elongated stop-support bar having a length extending substantially coextensively with and adjacent to said graduations collectively;

(c) means supporting said stop-support bar on said rigid member in a manner enabling said stop-support bar to be freely moved endwise thereon;

(d) means coactive between said rigid member and said stop-support bar for shifting said stop-support bar endwise with respect to said graduations, said stop-support bar normally remaining free to be moved toward the reference point while being shifted in either direction by said shifting means;

(e) means coactive between said rigid member and said stop-support bar and operative to indicate the distance which said stop-support bar has been moved endwise with respect to said graduations; and (f) a workpiece-locating stop slidably carried on and clampable to said stop-support bar at any selected position along its length and movable therewith.

17. A structure for accurately positioning a movable workpiece in relation to a predetermined fixed reference point, comprising in combination:

(a) an elongated rigid member having graduations disposed in fixed relation as to the distance to said reference point;

(b) an elongated stop-support bar having a length extending substantially coextensively with and adjacent to said graduations collectively;
(c) means supporting said stop-support bar on said rigid member in a manner enabling said stop-support bar to be freely moved endwise thereon;
(d) a spring normally urging said stop-support bar endwise to a normal operating position, such normal operating position being a fixed distance from said reference point for locating the workpiece;
(e) means operative against the force of said spring and acting between said rigid member and said stop-support bar for shifting said stop-support bar endwise; and
(f) a workpiece-locating stop slidably carried on and clampable to said stop-support bar at any selected position along its length and movable therewith to said normal operating position.

18. A structure for accurately positioning a movable workpiece in relation to a predetermined fixed reference point, comprising in combination:
(a) an elongated rigid member having graduations disposed in fixed relation as to the distance to said reference point;
(b) an elongated stop-support bar having a length extending substantially coextensively with and adjacent to said graduations collectively;
(c) means supporting said stop-support bar on said rigid member in a manner enabling said stop-support bar to be freely moved endwise thereon;
(d) a spring normally urging said stop-support bar endwise to a normal operating position, such normal operating position being a fixed distance from said reference point for locating the workpiece;
(e) a hand screw operative against the force of said spring and acting between said rigid member and said stop-support bar for shifting said stop-support bar endwise;
(f) a release mechanism carried by said elongated rigid member and normally coactive with the threads of said hand screw to enable said shifting, and operative, when actuated, to disengage said threads, to enable said spring to return said stop-support bar to said normal operating position; and
(g) a workpiece-locating stop slidably carried on and clampable to said stop-support bar at any selected position therealong and movable therewith to said normal operating position.

References Cited by the Examiner
UNITED STATES PATENTS

| | | | |
|---|---|---|---|
| 1,670,253 | 5/1928 | Gilbert et al. | 269—71 X |
| 2,447,612 | 8/1948 | Dowe | 33—147 |
| 2,524,256 | 10/1950 | Greany | 33—178 |
| 2,529,931 | 11/1950 | Gallup | 33—143 |
| 2,844,878 | 7/1958 | Zwierzynski | 33—170 |
| 2,879,600 | 3/1959 | Sorensen | 33—147 |
| 3,113,385 | 12/1963 | Carter | 33—169 |
| 3,198,164 | 8/1965 | Nyberg et al. | 33—174 |

LEONARD FORMAN, *Primary Examiner.*

S. S. MATTHEWS, *Assistant Examiner.*